March 19, 1940.                P. M. CURRIER                2,193,919
                    LIMITED SPEED SERIES THYRATRON MOTOR
                            Filed April 28, 1938

Inventor:
Philip M. Currier,
by Harry E. Dunham
His Attorney.

Patented Mar. 19, 1940

2,193,919

UNITED STATES PATENT OFFICE 2,193,919

LIMITED SPEED SERIES THYRATRON MOTOR

Philip M. Currier, Ballston Spa, N. Y., assignor to General Electric Company, a corporation of New York Application April 28, 1938, Serial No. 204,813

9 Claims. (Cl. 172—274)

My invention relates to control systems for electric motors and more particularly to such motors which are energized from an electric valve converting system supplying thereto alternating current of variable frequency.

Heretofore there have been proposed numerous arrangements for transmitting variable frequency alternating current from direct and alternating current circuits to a polyphase alternating current motor. In some arrangements the field winding of such alternating current motor has been connected in series with the various phase windings thereof so as to provide a series characteristic in the load speed characteristic of the motor. Under certain load conditions of such motors I have found that the series field weakens and therefore the motor tends to speed up. It would therefore be desirable if some means were provided for limiting the points on the speed torque characteristics of the motor at which the series field could no longer be weakened.

It is therefore an object of my invention to provide an improved control system for electric motors supplied by a variable frequency alternating current in which means are provided for determining the points on the speed torque characteristics at which the series field characteristic of the motor becomes predominant and below which the relatively constant field is maintained.

In accordance with my invention this is accomplished by supplying a predetermined amount of direct current to the field winding of the motor through a unilaterally conductive device so that at a desired point on the speed torque characteristic of the motor the series field characteristic of the motor becomes predominant. This direct current may be supplied from a separate source of direct current such as a motor generator set or from a rectifier and in the latter case the rectifier valves combine the function of the unilaterally conductive device.

Figure 1:
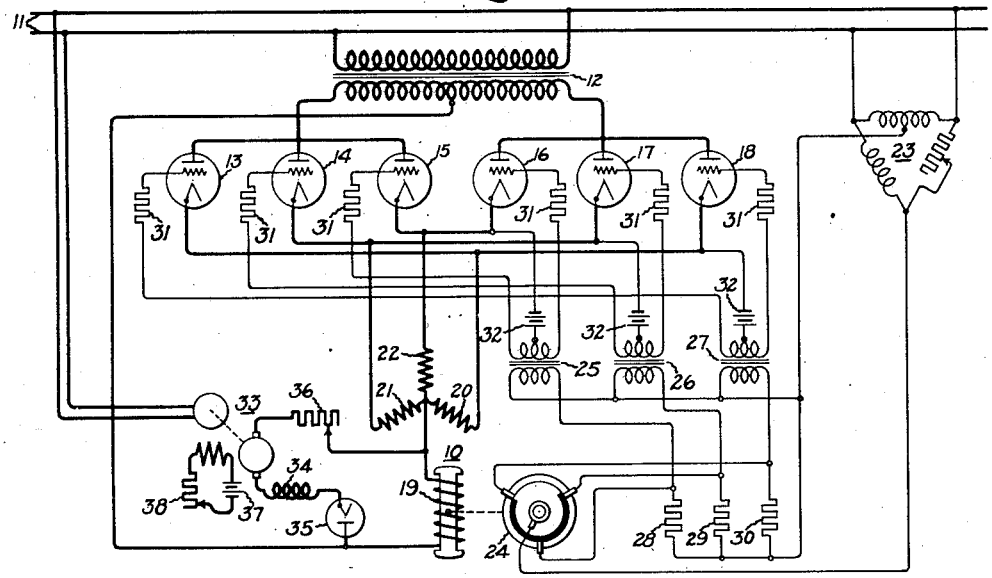

For a better understanding of my invention, together with other and further objects thereof, reference is had to the following description taken in connection with the accompanying drawing and its scope will be pointed out in the appended claims. Fig. 1 of the drawing shows one embodiment of my invention in which direct current is supplied to the field of the motor from a motor generator set to a unilaterally conductive device and means are provided for varying the amount of direct current thus supplied so as to determine at which point the series characteristics of the motor shall predominate; in Fig. 2 is shown a further embodiment of my invention in which a rectifier serves to supply direct current to the field winding of the motor and which rectifier is provided with a control circuit for determining the point of the speed torque characteristic of the motor at which the series characteristics of the motor shall become predominant.

Referring now to the drawing, there is illustrated an arrangement for operating an alternating current motor 10 from a suitable source of alternating current 11 by means of an electric valve converting system. This electric valve converting system includes a suitable transformer 12 and a plurality of electric valves 13, 14, 15, 16, 17 and 18, respectively. While a particular form of electric valve converting system such as has been shown in United States Letters Patent No. 1,959,200, granted May 15, 1934, upon the application of Helmut Cypra and assigned to the same assignee as the present application, has been illustrated in Fig. 1, it will be apparent to those skilled in the art that any other suitable electric valve converting apparatus may be substituted. The dynamo-electric machine 10 comprises a field winding 19 and a plurality of phase windings 20, 21 and 22. The anodes of the electric valves 13, 14 and 15 are connected to one terminal of the secondary winding of the transformer 12 whereas the anodes of the remaining electric valves 16, 17 and 18 are connected to the other terminal of the secondary winding of the transformer. The cathodes of the electric valves 13 and 18 are connected to one terminal of the phase winding 20. The cathodes of the valves 14 and 17 are connected to one terminal of the phase winding 21 and the cathodes of the remaining valves 15 and 16 are connected to one terminal of the phase winding 22 of the motor 10. The various phase windings 20, 21 and 22 of the dynamo-electric machine or motor 10 are connected in star connection and the neutral thereof is connected to one terminal of the field winding 19 of the motor, the other terminal of which is connected to a midpoint on the secondary winding of the transformer 12. A control circuit is provided for controlling the conductivities of the various valves and this includes a suitable source of potential obtained from the alternating current circuit 11 through a phase shifting circuit 23 which is applied to the valves through a distributor mechanism 24 and a plurality of control transformers 25, 26 and 27. The distributor mechanism 24 which is mounted on the shaft of the motor 10 is provided with a plurality of brushes which are connected across a plurality of resistors 28, 29 and 30. The windings of the control transformers 25, 26 and 27 are successively energized through the brushes of the distributor 24 by the potentials appearing across the resistors 28, 29 and 30, respectively. The secondary winding of the transformer 25 controls the conductivities of the valves 15 and 16; the secondary winding of the transformer 26 controls the conductivities of the valves 14 and 17; and the secondary winding of the transformer 27 controls the conductivities of the valves 13 and 18. Each of the control circuits of the valves 13, 14, 15, 16, 17 and 18, respectively, includes a suitable current limiting resistor such as resistor 31 and a suitable source of biasing potential 32.

In accordance with my invention a suitable motor generator set 33 energized from the alternating current circuit 11 serves to supply direct current to the field winding 19 of the motor 10 through an inductor 34, a unilaterally conductive device 35 and an adjustable resistor 36. The field winding of the generator is energized from a suitable source of direct current 37 through an adjustable resistor 38. The adjustment made upon the resistors 36 and 38 determines the amount of direct current flowing through the field winding 19 thereby determining the point on the speed torque curve of the motor 10 at which the series excitation of the motor becomes predominant. While the inductor 34 is not essential to all installations, in some instances it will be found desirable to utilize it in order to maintain the smoothing reactor qualities of the field 19 with reference to the action of the electric valve converting system. The unilaterally conductive device 35 which may be in the form of a rectifier tube or any contact rectifier serves to prevent current from flowing through the motor generator set in reverse direction whenever the potential appearing across the series connected field 19 is such as to exceed the potential supplied by the direct current source.

Figure 2:
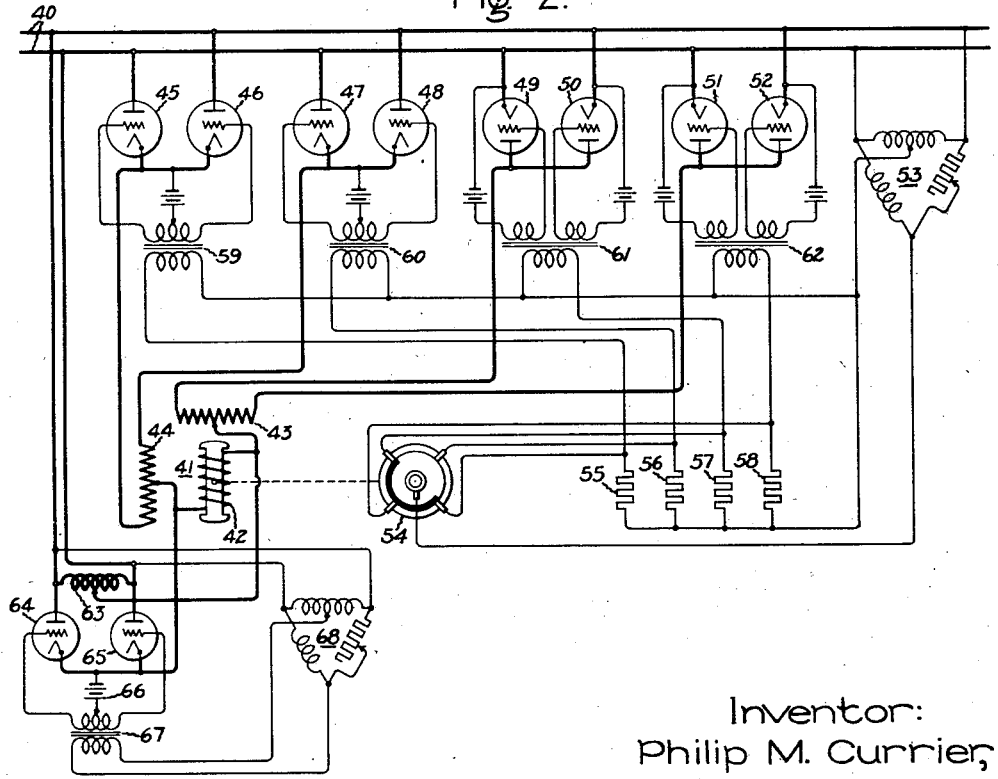

In Fig. 2 I have shown a further modification of my invention in which alternating current from a suitable source 40 is supplied to an alternating current motor 41 through an electric valve converting system of a type which has been shown and described in United States Letters Patent Reissue No. 20,364, reissued May 18, 1937, upon the application of E. F. W. Alexanderson and assigned to the same assignee as the present application. The alternating current motor 41 is of the bi-phase type which has a rotatable field winding 42 and a plurality of phase windings 43 and 44. The rotatable field winding 42 is connected in series between the mid-points of the various phase windings 43 and 44. An electric valve converting system including the pairs of valves 45, 46; 47, 48; 49, 50; 51, 52 interconnects the alternating current source 40 with the phase windings 43 and 44 of the alternating current motor 41. The cathodes of the pair of valves 45, 46 are connected to one terminal of the phase winding 44 whereas the cathodes of the second pair of valves 47 and 48 are connected to the other terminal of the phase winding 44. Similarly, the pair of valves 49, 50 have their anodes connected to one terminal of the phase winding 43 and the anodes of the pair of valves 51, 52 have their anodes connected to the other terminal of the phase winding 43. One valve of each pair of valves has its anode or cathode connected to a different one of the conductors of the alternating current circuit 40. A suitable control circuit is provided for controlling the conductivities of the various valves and this includes a suitable phase shifting circuit 53 for deriving from the source of alternating current 40 a suitable current of proper phase to be applied by means of a distributor 54 to a plurality of resistors 55, 56, 57 and 58 so that the potentials developed successively across these resistors will energize respectively the primary windings of the control transformers 59, 60, 61 and 2. The control transformer 59 controls a group of valves 45, 46, whereas the control transformers 60, 61 and 62, respectively, control the groups of valves 47, 48; 49, 50; and 51, 52. Each of the control circuits of the various pairs of valves includes the portion of the secondary winding of the control transformer and a suitable source of biasing potential. The control circuits may also include suitable current limiting resistors which are not shown. While each of the valves shown in Figs. 1 and 2 has been illustrated as comprising an anode, a cathode and a control electrode within an envelope containing an ionizable medium, it of course will be understood by those skilled in the art that any other suitable electric valve containing an anode, a cathode, a control member or electrode and having an ionizable medium may be utilized. Controlling the conductivities of the various electric valves by the distributor mechanism driven by the motor forms no part of my present invention, but is disclosed and broadly claimed in the United States Letters Patent No. 1,993,581, granted March 5, 1935, upon the application of E. F. W. Alexanderson and assigned to the same assignee as the present application.

In accordance with my invention a suitable rectifier arrangement comprising an inductor 63 and a pair of electric valves 64 and 65 is arranged to have the output thereof connected across the field winding 42 of the alternating current motor 41. These valves are of the controlled type and as illustrated show control grids energized from control circuits including a suitable source of biasing potential 66 and a portion of the secondary winding of the control transformer 67, the primary winding of which is energized from a suitable phase shifting circuit 68 which is connected to the alternating current circuit 40. By adjustment of the phase shifting circuit 68 the degree of conductivity of the electric valves 64 and 65 is so controlled as to determine the amount of direct current to be supplied to the field winding 42 with the result that there is determined the point upon the speed torque characteristic of the motor at which the series excitation of the alternating current motor 41 becomes predominant.

It therefore will become apparent to those skilled in the art from the description taken in connection with Figs. 1 and 2 that the relative speed and torque of the alternating current motor may be controlled by suitable adjustments of the phase shifting devices 23 and 53, respectively. The speed torque characteristics of these motors at light load may be maintained at a relative constant value by suitable adjustments of the means which supplies the direct current excitation to the field winding at light load. In the arrangement shown in Fig. 2 the unilateral conductivity properties of the valves 64 and 65 serve the same purpose as the unilaterally conductive device 35 in Fig. 1.

Although I have described my invention as applied to transmitting energy from single phase alternating current sources to three phase and quarter phase alternating current motors, it will be obvious to those skilled in the art that my invention is equally applicable to other forms of motors and may utilize other forms of electric valve converting apparatus for supplying alternating current to these motors in accordance with the teachings of my invention.

While I have described what I at present consider preferred embodiments of my invention, it will be obvious to those skilled in the art that various changes and modifications may be made without departing from the scope of my invention, and I, therefore, aim in the appended claims to cover all such changes and modifications as fall within the true spirit and scope of my invention.

What I claim as new and desire to secure by Letters Patent of the United States is:

1. The combination of a source of current, a dynamo-electric machine having a plurality of phase windings and a field winding, an electric valve converting apparatus interconnecting said source and said machine, means for energizing said field winding with current directly proportional to the current traversing said phase windings, and additional means including a unilaterally conductive device for supplying a component of excitation to said field winding to strengthen the field produced by said field winding when the current traversing said phase windings is reduced below a certain value, said additional means being ineffective to modify action of the phase energization means when the current traversing said phase windings exceeds a certain value.

2. The combination of a source of current, a dynamo-electric machine having a plurality of phase windings and a field winding, an electric valve converting apparatus interconnecting said source and said machine for supplying thereto a variable frequency periodic current, means for providing at low speeds of said machine a predominant series excitation of said field winding, and means having an impedance greater than that of said field winding for providing at high speeds of said machine a predominant shunt excitation of said field winding.

3. The combination of a source of current, a dynamo-electric machine having a plurality of phase windings and a field winding, an electric valve converting apparatus interconnecting said source and said machine, means for energizing said field winding with current directly proportional to the current traversing said phase windings, additional means including a unilaterally conductive device for supplying a component of excitation for said field winding independently of a current traversing said phase windings, and means for controlling said additional means and effective only when the current traversing said phase winding is reduced below a certain value to determine the point on the speed torque curve of said machine at which excitation in accordance with the current traversing said phase windings shall predominate.

4. The combination of a source of current, a dynamo-electric machine having a plurality of phase windings connected in series with a field winding, an electric valve converting apparatus interconnecting said source and said machine, means for controlling the valves of said apparatus in accordance with the speed of said machine, a unilaterally-conductive device, and means for supplying through said unilaterally-conductive device a predetermined amount of shunt excitation to the field of said machine in response to the current transmitted by said phase windings.

5. The combination of a source of current, a dynamo-electric machine having a plurality of phase windings connected in series with a field winding, an electric valve converting system interconnecting said source and said machine for supplying variable frequency periodic current thereto, a source of direct current, a unilaterally conductive device, and means for supplying a predetermined amount of current from said latter source through said unilaterally-conductive device to the field winding of said machine.

6. The combination of a source of current, a dynamo-electric machine having a plurality of phase windings connected in series with a field winding, an electric valve converting apparatus interconnecting said source and said machine for supplying thereto a variable frequency periodic current, a second source of current, an electric valve rectifier energized from said second source of current, and means connecting the output of said rectifier across the field winding of said machine to supply an additional exciting current to said field winding which has a magnitude substantially independent of the current flowing in said phase windings and which flows only when the current traversing said phase windings is reduced below a predetermined value.

7. The combination of a source of alternating current, a dynamo-electric machine having a plurality of phase windings connected in series with a field winding, an electric valve converting apparatus interconnecting said source and said machine for supplying thereto a variable frequency periodic current, an electric valve rectifier energized from said source of current, and means connecting the output of said rectifier across the field winding of said machine to supply an additional exciting current to said field winding which has a magnitude substantially independent of the current flowing in said phase windings and which flows only when the current traversing said phase windings is reduced below a predetermined value.

8. The combination of a source of current, a dynamo-electric machine having a plurality of phase windings and a field winding connected in series therewith, an electric valve converting apparatus interconnecting said source with said machine, a source of current, an electric valve rectifier energized from said latter source and connected across said field winding to supply a shunt excitation component thereto, and a control circuit for the valves of said rectifier for controlling the point on a speed torque curve of said machine at which the series excitation component of said field winding shall predominate.

9. The combination of a source of alternating current, a dynamo-electric machine having a plurality of phase windings and a field winding connected in series therewith, an electric valve converting apparatus interconnecting said source with said machine, an electric valve rectifier energized from said source and connected across said field winding to supply a shunt excitation component thereto, and a control circuit for the valves of said rectifier for controlling the point on the speed-torque curve of said machine at which the series excitation component of said field winding shall predominate.

PHILIP M. CURRIER.